E. H. DAWES.
Dung-Fork.

No. 10,148.

Patented Oct. 25, 1853.

UNITED STATES PATENT OFFICE.

EZRA H. DAWES, OF LITCHFIELD CORNERS, MAINE.

IMPROVEMENT IN DEVICES OF A CONVERTIBLE DUNG-FORK.

Specification forming part of Letters Patent No. 10,148, dated October 25, 1853.

*To all whom it may concern:*

Be it known that I, EZRA H. DAWES, of Litchfield Corners, in the county of Kennebec and State of Maine, have made certain new and useful Improvements in Dung-Forks; and I hereby declare the following to be a full, clear, and exact description of the same, reference being had to the annexed drawings, making part of this specification, in which—

Figure 1:
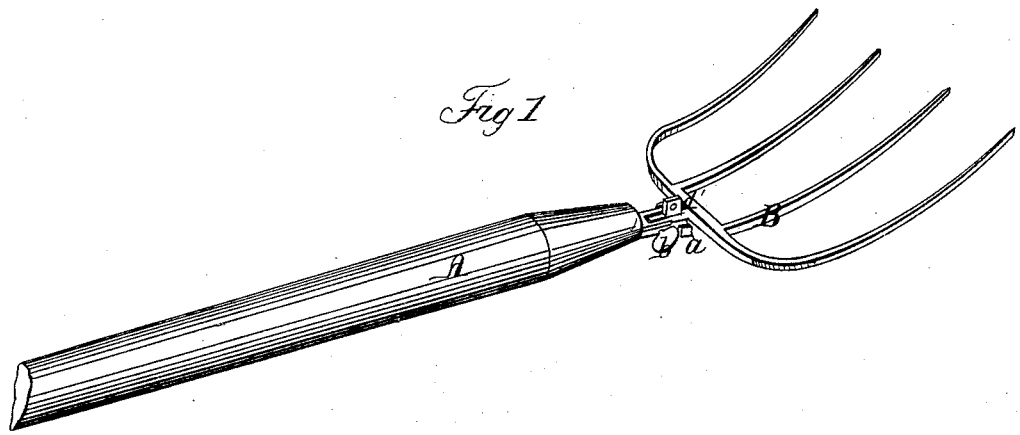
Figure 2:
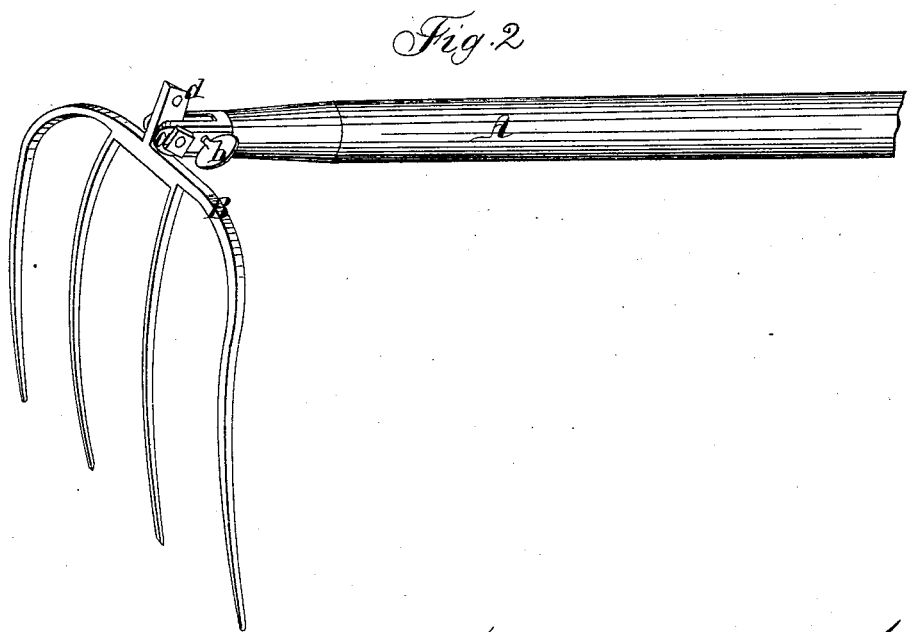
Figure 3:

Figure 1 is a view of a fork constructed upon my improved plan; Fig. 2, the same with the tines revolved upon the handle, for a purpose to be hereinafter explained. Fig. 3 is a side view of the tines, showing the lugs by which they are secured to the handle.

The nature of my invention consists in attaching the tines of an ordinary dung-fork to the handle by means of a joint, round which they are permitted to revolve in such a manner that they may be secured in one of two positions. The same instrument is thus made to serve a double purpose, and may be used either as an ordinary dung-fork or as a garden-cultivator or pronged hoe; or, having been made use of as an ordinary dung-fork with which to load manure, it may be instantaneously shifted, so as to serve the purpose of hauling the manure from the cart into hills or otherwise, as the case may require.

To enable others skilled in the art to make and use my invention, I will proceed to describe its construction and operation.

A is the handle of the fork; B, the tines, which, instead of being made fast to the handle, are hung upon a pivot or pin at $a$.

$b$ is a thumb screw working in a socket, $c$, in the handle, and which may be made to enter either one or the other of two holes, $d$ $d'$, in the shank of the tines. When secured in one position, as seen in Fig. 1, the instrument may be used as a common dung-fork. When it is to be revolved into the other position, as seen in Fig. 2, the screw $b$ is loosened, and after the tines are revolved the requisite distance the screw is made to enter the other hole, $d'$, and the instrument may then be used to haul the manure from the cart, or as an instrument to cultivate among garden-vegetables. The same instrument is thus made to serve two purposes, and the necessity of carrying another tool oftentimes avoided.

It is evident that there are a variety of methods in which my invention may be carried out. For instance, the tines may be held in place by a pin, by a spring-key, by spring-catches, bolts, or otherwise. This, however, I consider but a modification of my invention.

What I claim as my invention, and desire to secure by Letters Patent, is—

Making the tines of ordinary dung or hay forks to revolve upon the handle, in the manner and for the purpose herein set forth.

In testimony whereof I have hereunto set my signature this 25th day of July, 1853.

EZRA H. DAWES.

Witnesses:
  WILLIAM ROBINSON,
  MELLEN ROBINSON.